INVENTOR.
Donald W. Dunipace
BY
Nobbe & Swope
ATTORNEYS

3,157,483
Patented Nov. 17, 1964

3,157,483
TEMPERATURE CONTROL OF MOLTEN GLASS
Donald W. Dunipace, Perrysburg, Ohio, assignor to Libby-Owens-Ford Glass Company, Toledo, Ohio, a corporation of Ohio
Filed Apr. 10, 1958, Ser. No. 727,584
8 Claims. (Cl. 65—204)

The present invention relates broadly to the production of so called sheet or window glass and more particularly to improved techniques and apparatus for producing such glass with a minimum of distortion.

The term window or sheet glass used herein is intended to mean flat drawn glass having fire-polished surfaces attained during sheet formation as distinguished from plate glass which has mechanically ground and polished surfaces.

As is well known commercial sheet or window glass is produced by drawing a sheet or ribbon from a mass of molten glass directly into final usable form and requires no subsequent surfacing treatment to impart smoothness and transparency. However, one of the disadvantages of drawn sheet glass has been waviness or so called "distortion" in the finished product. Such distortion is due to a lack of thickness uniformity, or differently expressed, to alternately thick and thin areas in the glass sheet. Different varieties of distortion are known in the art by various names which have been coined to designate specific types. Among these are "long-wave distortion," "short-wave distortion," "hammer," "matter," etc.

It is my belief that these distortion defects in sheet glass are due to the presence of non-uniform and uncontrolled conditions within the glass furnaces. More specifically, I believe they are due to a lack of a sufficiently uniform temperature condition from side to side or edge to edge of the stream or channel of molten glass flowing toward and into the zone of sheet formation and also to the adverse influence of thermally induced air or convection currents that move toward, along and around the newly formed sheet.

Moreover, I have actually proven that the distortion difficulties, that have hereinbefore been considered to be almost a characteristic of as well as a necessary evil in the commercial window glass production, can be overcome by proper control of atmospheric and temperature conditions within the furnace.

Therefore, it is the primary aim of this invention to substantially reduce, if not to entirely eliminate, distortion defects in window glass and distortion problems in its production.

Another object of the invention is to accomplish the above purpose by special control of air movements within the sheet glass furnace.

Another object is to assist in accomplishing the desired results by correctly regulating temperature of the molten glass across the width of the furnace.

Other objects and advantages of the invention will become more apparent during the course of the following description when taken in connection with the accompanying drawings.

In the drawings, wherein like numerals are employed to designate like parts throughout the same:

It has been customary, in most attempts to improve window glass distortion, to take the corrective measures in and around the zone of sheet formation. It was recognized that thickness distortion was produced in the ribbon as it was formed, as a result of the localized cooling action of turbulent air and these corrective measures were aimed at modifying those air currents by controlling the motion of the air around the meniscus.

In the present invention the cooling action, normally supplied by the air current, is replaced by radiant cooling or the loss of heat by radiation to surroundings of the molten glass both in the cooling chamber and in the draw pot.

Figure 1:
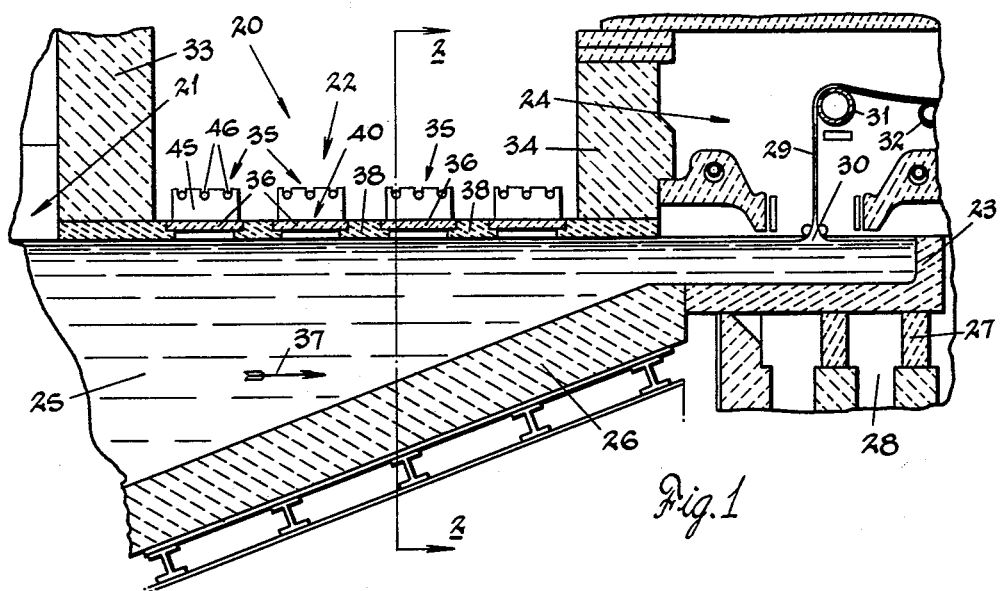
FIG. 1 is a longitudinal side view taken in section of the cooling and drawing chambers of a continuous glass furnace line.

Referring now to FIG. 1, there has been illustrated therein the refining and working end of a continuous glass sheet furnace which in its entirety is referred to by numeral 20. Conventional furnaces of this type include a regenerative type melting tank which supplies molten glass to one or more cooling chambers and pots by way of suitable channels. Since this invention relates only to that portion of the furnace where the sheet is cooled and formed, only those feautres necessary for an understanding of the invention will be hereinafter described.

The forward end of channel 21 is joined to the cooling chamber generally indicated at 22, and the molten glass flows freely therethrough to the draw pot chamber 23 positioned below a drawing or forming chamber 24. With a continuous tank-furnace stream of molten glass 25, previously melted in the melting tank, flows through the channel 21 within which it is properly conditioned and from the channel the molten glass moves through cooling chamber 22 where it is gradually brought down towards working temperature and it finally flows across the bottom wall 26 of the cooling chamber into the working receptacle or draw pot 23 from which the sheet or ribbon glass may be continuously drawn. The draw pot 23 is a conventional Colburn type window glass machine supported upon stools 27, within pot chamber 28, and may be heated by gas flame from a burner (not shown) if desired.

A sheet or ribbon of glass 29 is continuously drawn from meniscus 30 upwardly from the surface of the molten bath within the draw pot 23 and while still in a semiplastic condition, although substantially set in its final sheet form, is its deflected into the horizontal plane about a bending roll 31. Subsequently the glass ribbon passes over the machine rolls 32 to a flattening chamber and then to an annealing lehr.

Within the cooling chamber 22, FIG. 1, and between the end walls 33, 34 thereof, are a plurality of cooling units 35. Each of these units includes a substantially horizontal transparent window 36 (FIG. 2) which extends transversely of the path of the molten glass 25 moving in the direction of arrow 37. Window 36 is set into support members 38 (FIG. 2) which rest upon the opposite side walls 39 of the cooling chamber 22. As seen in FIG. 1, besides supporting the ends of windows 36, the members 38 extend transversely across the glass stream 25 between adjacent parallel windows 36 and are joined thereto to form a low hanging roof 40 or cover in close proximity to the surface of the molten bath in the cooling chamber between the walls 33, 34. Under this roof 40 a reduced volume area air space 41 exists between the bottom edge 42 of the window 36 and the upper surface 43 of the glass stream 25 and between the lower edge 44 of the support members 38 and the upper surface 43 of the glass stream, in the area of the roof between windows 36, to contain an air blanket in which turbulence is inhibited.

These windows 36 and the air blanket isolate the cold and hot as far as the transfer of heat by convection is concerned but do not isolate the cold and hot as far as the transfer or loss of heat by radiation is concerned. In the preferred embodiment the windows are made of quartz which has been found to be particularly well suited to accomplish the above radiant passage of heat without convection passage of heat.

Suitably mounted, by the means of series of upstanding brackets 45 on opposite sides of the tank 22, are a plurality of cooling pipes 46. In the embodiment shown there are three pipes 46 for each unit 35, each pipe extending parallel to the series of windows 36 and transversely to the direction of movement of the molten glass. Since the roof 40 is parallel to the upper surface 43 of the molten glass stream 25, it is noted that space 41 between the roof 40 and the top surface of the molten bath 43 is constant in height, across the width of the bath.

By maintaining the windows 36 and members 38 comprising roof 40 in tight integral relationship with each other and as seen in FIG. 1, extending the roof between walls 33 and 34, a well insulated cover is formed over the molten glass to maintain in space 41 a blanket of hot stagnant air in which turbulence is inhibited. This blanket of air allows the heat rising from the bath to pass therethrough by transmission only. The heat energy would further pass by radiation through the transparent windows 36 and this radiation is assisted by providing means associated with said cover for dissipating heat transmitted by said cover by supplying a heat sink in the form of pipes 46 carrying a cooling fluid, introduced by suitable leads in a manner so that it flows in an endless and everchanging manner through pipes 46. This water cooling over the quartz windows 36 is for the purpose of assuring that the opaque receiver of the radiated heat located in the line of sight of the radiated heat, i.e., in this case the water cooling pipes 46 themselves, will absorb the radiant energy but will only re-emit a negligible amount. In general any opaque receiver could be used provided that it was composed of material that was nonreflective and a good heat absorbent and providing it is maintained at a substantially lower temperature then the glass surface. The temperature of the receiver can be adjusted to give the desired rate of cooling. The transparent windows 36 held in tightly enclosed relationship to the molten glass bath with blocks 38 to form roof 40, determine a well insulated cover to eliminate air currents or air flow and convection transfer of heat induced by such air turbulence. The windows therefore assist in eliminating turbulent air and allow essentially only a heat loss by radiation.

It has been found that the advantages resulting from the prevention of convection losses of heat gained by the elimination or substantial reduction of the air movement over the stream of glass, are improved as the volume of the air blanket between the lower surface 42 of windows 36 and the lower edge 44 of support members 38 and the upper surface of the stream of glass is reduced.

Figure 3:
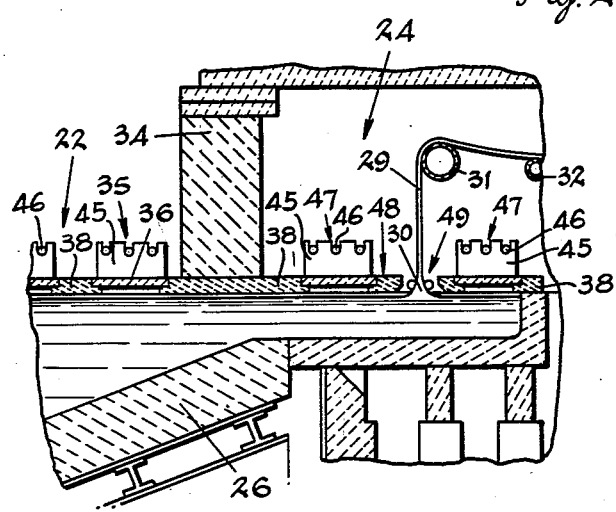
FIG. 3 is an enlarged sectional view of the drawing pot portion of FIG. 1, illustrating the application of the present invention.

Referring to FIG. 3 in addition to units 35, hereinabove described positioned in the cooling chamber 22, units 47 similar to the units 35 may be provided in the forming chamber 24 over the draw pot 23 in close proximity to the surface of the molten glass, to form a draw pot cover 48. Opening 49 is provided between units 47 so that the glass may be drawn upwardly therebetween in ribbon 29 and around the bending roller 31 as hereinbefore described. In this modification it has been found that by placing a blanket of hot stagnant air over the draw pot within at least 6 feet of the meniscus 30, at which the forming at the ribbon takes place, distortions in the glass are prevented.

Therefore, cooling of the molten glass in the draw pot chamber 24 by units 47 and cooling of the molten glass by the units 35 in the cooling chamber 22 is effected by the use of transparent quartz windows and a blanket of stagnant air that cooperate to minimize convection heat loss and accentuate heat losses by radiation.

Figure 2:
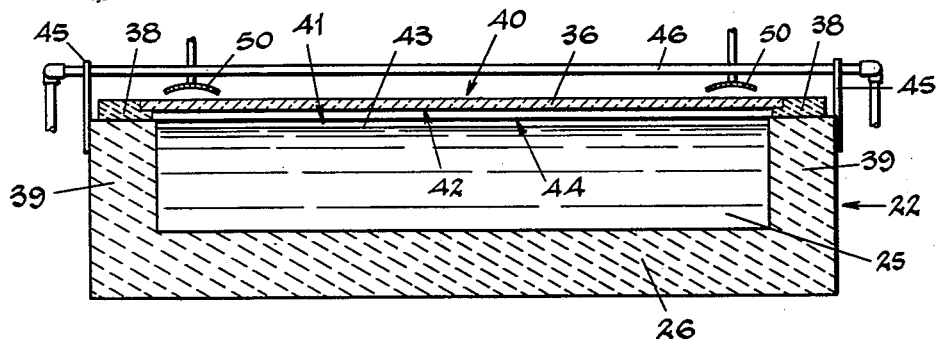
FIG. 2 is a sectional view taken along the line 2—2 of FIG. 1.

Should it become desirable for some reason to cut back or reduce this cooling action at some point along or across the course of the flow of the molten glass such as, for example, adjacent the edges of the stream where the heat loss is naturally greatest through contact with the furnace side walls, then suitable means may be provided to interrupt the radiant cooling. By thus reducing radiant cooling through the quartz windows at the edges of the furnace, a uniform temperature may be maintained in the molten glass across the channel. Referring to FIG. 2 there are shown adjustable and removable heat interceptors or reflectors 50 positioned between the cooling pipes 46 and the windows 36. The interceptors 50 will then receive the heat radiated through the air blanket and window 36 therebeneath and redirect it back to prevent or reduce the heat loss in specific areas as desired. Such interceptors would normally be composed of a material that was a poor absorbent and a good reflector, however, other means, such as an insulating block, could be used to prevent heat losses at any point along the path of the molten glass to overcome excessive cooling and such additional means are considered fully within the scope of my invention.

These reflectors 50 are removably mounted by any suitable means and are also mounted so that they may be adjustably positioned transversely of the stream of glass. In addition they may be of any desired length so as to be capable of controlling the cooling along any desired longitudinal portion of the stream. Likewise their relative height, with respect to the windows 36 of unit 47, is also adjustable so that maximum selectivity of the area of the arch to which they will redirect the intercepted or reflected heat is possible.

In the embodiment shown there are two reflectors 50, one on each side of the bath, however, this is intended by way of illustration only and there is no intention to restrict either the number of interceptors or their actual position as they may be employed as desired to secure control over the cooling of the glass stream.

It is to be understood that the form of the invention herewith shown and described is to be taken as a preferred embodiment of the same, but that various changes in the shape, size and arrangement of parts may be resorted to without departing from the spirit of the invention or the scope of the following claims.

I claim:

1. In apparatus for producing flat drawn window glass, the combination with a cooling chamber and a working receptacle from which a continuous glass ribbon is drawn, said cooling chamber and working receptacle defining a path along which a stream of molten glass flows, of high heat transmitting cover in close proximity to the surface of the stream of molten glass and extending from side to side of at least a portion thereof to thereby establish a blanket of hot stagnant air in the space between said cover and the surface of the molten glass stream and inhibit turbulence in said blanket of air, a portion of said cover having uniform heat transmitting properties over its entire area to allow heat to escape from the surface of the molten glass through the air blanket and said cover by radiation only and means associated with said cover for dissipating heat transmitted by said cover.

2. In apparatus for producing flat drawn window glass, the combination with a cooling chamber and a working receptacle from which a continuous glass ribbon is drawn, said cooling chamber and working receptacle defining a path along which a stream of molten glass flows, of a high heat cover in close proximity to the surface of the stream and extending from side to side of at least a portion transmitting thereof to establish a blanket of hot stagnant air in the space between said cover and the surface of the molten glass stream and inhibit turbulence in said blanket of air, a portion of said cover being made of quartz and having uniform heat transmitting properties over its entire area to allow heat to escape from the surface of the molten glass through the air blanket and said quartz portion of said cover by radiation only, and means associated with said cover for dissipating heat transmitted by said cover.

3. In a glass melting furnace having a cooling chamber and a working receptacle from which a glass sheet is vertically drawn, said cooling chamber and working receptacle having side walls and a bottom wall defining a path along which a continuous stream of molten glass flows, the improvement comprising the combination of a heat transmitting cover over a portion of said glass stream to cool the same by radiant heat loss only, said cover including a substantially horizontal quartz window extending transversely of and from side to side of the path of flow of the molten glass, means supporting said window in close proximity to the surface of the molten glass stream to establish a blanket of hot stagnant air in the space between said cover and said surface and inhibit turbulence in said blanket of air and means associated with said cover for dissipating heat transmitted by said cover.

4. In a glass melting furnace as defined in claim 3, wherein said cover includes a plurality of parallel windows over the molten glass stream in said cooling chamber and a plurality of support members, said support members mounted upon the side walls of said cooling chamber extending transversely of the path of flow of the molten glass and positioned between and joined to adjacent windows.

5. In a glass melting furnace as defined in claim 3, wherein said cover includes at least two quartz windows over the glass stream in the working receptacle, one of said windows being positioned on each side of the glass sheet drawn from said working receptacle.

6. In a glass melting furnace as defined in claim 3, wherein said heat dissipating means includes a plurality of pipes through which a cooling fluid is continuously circulated, and means mounting said heat dissipating means including a pair of mounting brackets, each bracket being mounted to a side wall of said furnace, said brackets supporting the cooling pipes above and spaced from said quartz window.

7. In a glass melting furnace as defined in claim 6, including a heat reflector positioned over the edge portions of the path of molten glass in the space between said cooling pipes and said window, said reflectors intercepting the portion of the heat radiated from said window along the edges of the glass stream to redirect the intercepted heat back onto the upper surface of said window.

8. In a glass melting furnace having a cooling chamber and a working receptacle from which a glass sheet is vertically drawn, said cooling chamber and working receptacle having side walls and a bottom will defining a path along which a continuous stream of molten glass flows, the improvement comprising the combination of a heat transmitting cover over said glass stream to cool the same by radiant heat loss only, said cover including a plurality of parallel substantially horizontal quartz windows extending transversely over the path of flow of molten glass in the cooling chamber and from side to side thereof, means supporting said windows in close proximity to the surface of the molten glass stream to establish a blanket of hot stagnant air in the space between said cover and said surface and inhibit turbulence in said blanket of air, said support means including a plurality of support members extending transversely of the path of flow of the molten glass and positioned between and joined to adjacent windows, said support members being mounted on the side walls of said cooling chamber, means associated with said cover for dissipating heat transmitted by said cover and at least two parallel windows extending over and from side to side of the glass stream in the working receptacle, at least one of said windows being positioned on an opposite side of the glass sheet drawn from said working receptacle.

References Cited in the file of this patent

UNITED STATES PATENTS

| | | |
|---|---|---|
| 776,196 | Nicholls | Nov. 29, 1904 |
| 1,391,406 | Rhonemus | Sept. 20, 1921 |
| 1,724,340 | Charles | Aug. 13, 1929 |
| 1,751,045 | Mambourg | Mar. 18, 1930 |
| 1,796,836 | Drake | Mar. 17, 1931 |
| 1,841,717 | Drake | Jan. 19, 1932 |
| 1,893,061 | Peiler | Jan. 3, 1933 |
| 1,923,942 | Lufkin | Aug. 22, 1933 |
| 1,953,023 | Mulholland | Mar. 27, 1934 |
| 2,042,852 | Koupal | June 2, 1936 |
| 2,131,215 | Bivort | Sept. 27, 1938 |
| 2,139,770 | Peiler et al. | Dec. 13, 1938 |
| 2,140,281 | Drake | Dec. 13, 1938 |
| 2,258,121 | Menoher | Oct. 7, 1941 |
| 2,331,946 | Pazsiczky et al. | Oct. 19, 1943 |
| 2,587,914 | Smith | Mar. 4, 1952 |
| 2,691,247 | Henry et al. | Oct. 12, 1954 |
| 2,864,203 | Long | Dec. 16, 1958 |

FOREIGN PATENTS

| | | |
|---|---|---|
| 643,711 | France | May 21, 1928 |
| 384,295 | Great Britain | Feb. 26, 1931 |
| 599,957 | Great Britain | Mar. 24, 1948 |

UNITED STATES PATENT OFFICE
CERTIFICATE OF CORRECTION

Patent No. 3,157,483

November 17, 1964

Donald W. Dunipace

It is hereby certified that error appears in the above numbered patent requiring correction and that the said Letters Patent should read as corrected below.

Column 4, line 49, after "of", second occurrence, insert -- a --; same column 4, line 67, after "heat" insert -- transmitting --.

Signed and sealed this 6th day of April 1965.

(SEAL)
Attest:

ERNEST W. SWIDER
Attesting Officer

EDWARD J. BRENNER
Commissioner of Patents